United States Patent
Mukai

(10) Patent No.: US 9,124,745 B2
(45) Date of Patent: Sep. 1, 2015

(54) IMAGE READING APPARATUS

(71) Applicant: Takaaki Mukai, Iwakura (JP)

(72) Inventor: Takaaki Mukai, Iwakura (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/210,643

(22) Filed: Mar. 14, 2014

(65) Prior Publication Data

US 2014/0293375 A1    Oct. 2, 2014

(30) Foreign Application Priority Data

Mar. 29, 2013   (JP) ................................ 2013-070813

(51) Int. Cl.
   *H04N 1/04* (2006.01)
   *H04N 1/00* (2006.01)
(52) U.S. Cl.
   CPC ....... *H04N 1/00615* (2013.01); *H04N 1/00591* (2013.01)
(58) Field of Classification Search
   CPC ..... H04N 1/193; H04N 1/12; H04N 1/00602; H04N 1/0057; H04N 1/00588; H04N 1/121; H04N 1/107; H04N 2201/0082; H04N 1/1077
   USPC .......... 358/496, 498, 473, 488, 486; 399/361, 399/370, 372, 376
   See application file for complete search history.

(56) References Cited

U.S. PATENT DOCUMENTS

| | | | |
|---|---|---|---|
| 6,139,206 A * | 10/2000 | Ahn | 400/323 |
| 6,233,059 B1 * | 5/2001 | Kodaira et al. | 358/1.9 |
| 6,315,283 B1 * | 11/2001 | Haas et al. | 271/124 |
| 6,519,047 B1 * | 2/2003 | Ahn | 358/1.12 |
| 6,542,262 B1 * | 4/2003 | Tachibana et al. | 358/487 |
| 6,942,213 B2 * | 9/2005 | Endo et al. | 271/186 |
| 7,561,313 B2 | 7/2009 | Endo | |
| 7,617,985 B2 * | 11/2009 | van Os | 235/475 |
| 7,872,783 B2 | 1/2011 | Kitagawa et al. | |
| 7,954,803 B2 | 6/2011 | Kitagawa et al. | |
| 7,971,866 B2 * | 7/2011 | Huang et al. | 271/9.01 |
| 8,169,669 B2 * | 5/2012 | Yoshida et al. | 358/471 |
| 8,508,817 B2 | 8/2013 | Sato | |

(Continued)

FOREIGN PATENT DOCUMENTS

| | | | |
|---|---|---|---|
| JP | H07-302032 A | 11/1995 | |
| JP | H09-284478 A | 10/1997 | |

(Continued)

OTHER PUBLICATIONS

May 26, 2015—(JP) Notification of Reasons for Rejection—App 2013-070813, Eng Tran.

*Primary Examiner* — Cheukfan Lee

(74) *Attorney, Agent, or Firm* — Banner & Witcoff, Ltd.

(57) ABSTRACT

An image reading apparatus includes a conveyor. The conveyor is configured to convey a first medium in a first conveyance direction along a first conveyance path and a second medium in a second conveyance direction along a second conveyance path. The image reading apparatus includes a reader. The reader is configured to read image data from the first medium and the second medium. The image reading apparatus includes a movable guide. The movable guide is disposed on a housing of the image reading apparatus. The movable guide is configured to be moved to regulate a width of the second opening defined in a direction perpendicular to the second conveyance direction.

19 Claims, 11 Drawing Sheets

(56) References Cited

U.S. PATENT DOCUMENTS

| | | |
|---|---|---|
| 8,587,845 B2 * | 11/2013 | Yonemura et al. ............ 358/498 |
| 8,675,262 B2 * | 3/2014 | Hanamoto et al. ............ 358/474 |
| 2005/0057785 A1 | 3/2005 | Endo |
| 2007/0095917 A1 * | 5/2007 | van Os .......................... 235/454 |
| 2007/0158432 A1 * | 7/2007 | Tadamasa ..................... 235/480 |
| 2008/0259414 A1 | 10/2008 | Kitagawa et al. |
| 2008/0285097 A1 | 11/2008 | Kitagawa et al. |
| 2010/0157391 A1 | 6/2010 | Sato |
| 2011/0043579 A1 * | 2/2011 | Leppanen ..................... 347/104 |
| 2012/0105925 A1 | 5/2012 | Shirai et al. |
| 2013/0057932 A1 * | 3/2013 | Mukai ........................... 358/498 |
| 2013/0222867 A1 * | 8/2013 | Tomita, Ryuta .............. 358/498 |
| 2014/0071503 A1 * | 3/2014 | Mukai et al. .................. 358/498 |
| 2014/0092451 A1 * | 4/2014 | Mizuno ......................... 358/498 |
| 2014/0092456 A1 * | 4/2014 | Ukai .............................. 358/498 |
| 2014/0103598 A1 * | 4/2014 | Kuriki .......................... 271/3.19 |
| 2014/0293374 A1 * | 10/2014 | Nakayama .................... 358/498 |
| 2015/0062667 A1 * | 3/2015 | Kuriki .......................... 358/474 |

FOREIGN PATENT DOCUMENTS

| | | |
|---|---|---|
| JP | 10175740 A * | 6/1998 |
| JP | 2005-051313 A | 2/2005 |
| JP | 2008-270954 A | 11/2008 |
| JP | 2008-285259 A | 11/2008 |
| JP | 2010-171953 A | 8/2010 |
| JP | 2011-066676 A | 3/2011 |
| JP | 2012-015677 A | 1/2012 |
| JP | 2012-034186 A | 2/2012 |
| JP | 2012-065064 A | 3/2012 |
| JP | 2012-100115 A | 5/2012 |
| JP | 2012-171788 A | 9/2012 |
| JP | 2012-171789 A | 9/2012 |
| JP | 2012-184057 A | 9/2012 |
| JP | 2012-216930 A | 11/2012 |
| JP | 2012-216931 A | 11/2012 |

* cited by examiner

IMAGE READING APPARATUS

CROSS-REFERENCE TO RELATED APPLICATION

This application claims priority from Japanese Patent Application No. 2013-070813 filed on Mar. 29, 2013, the content of which is incorporated herein by reference in its entirety.

TECHNICAL FIELD

The disclosure relates to an image reading apparatus and a medium conveyance apparatus.

BACKGROUND

A known image reading apparatus includes a housing, a first guide portion, a second guide portion, and a reader. The housing has a first introduction opening, a second introduction opening, and a discharge opening. A medium is inserted into the first introduction opening. The medium inserted into the first introduction opening is discharged from the discharge opening. A portion of the discharge opening serves as the second introduction opening. The length of the second introduction opening in a width direction is shorter than that of the first introduction opening. A medium having a width smaller than that of the medium to be inserted into the first introduction opening is inserted into the second introduction opening. The medium inserted into the second introduction opening enters into the housing and is then conveyed backwards to discharge from the discharge opening. The first guide portion has a conveyance path through which the medium inserted into the first introduction opening is guided toward the discharge opening. The second guide portion is configured to guide the medium inserted into the second introduction opening to join the conveyance path. The reader is positioned on the side of the discharge opening with respect to a position where the second guide portion joins the conveyance path. The reader is configured to read an image on a medium guided by the first guide portion or the second guide portion.

SUMMARY

The image reading apparatus does not include a member configured to guide a medium inserted from outside the housing. Therefore, when a medium is slantingly inserted into the second introduction opening, the reader reads an image on the medium that may be conveyed slantingly. Accordingly, a reading quality of the image on the medium is likely to be reduced.

The disclosure relates to an image reading apparatus that may reduce or prevent a reduction in a reading quality of an image on a medium inserted from a second introduction opening of the image reading apparatus, and a medium conveyance apparatus.

BRIEF DESCRIPTION OF THE DRAWINGS

For a more complete understanding of the disclosure, needs satisfied thereby, and the objects, features, and advantages thereof, reference now is made to the following descriptions taken in connection with the accompanying drawing.

DETAILED DESCRIPTION OF EMBODIMENTS

Figure 1:
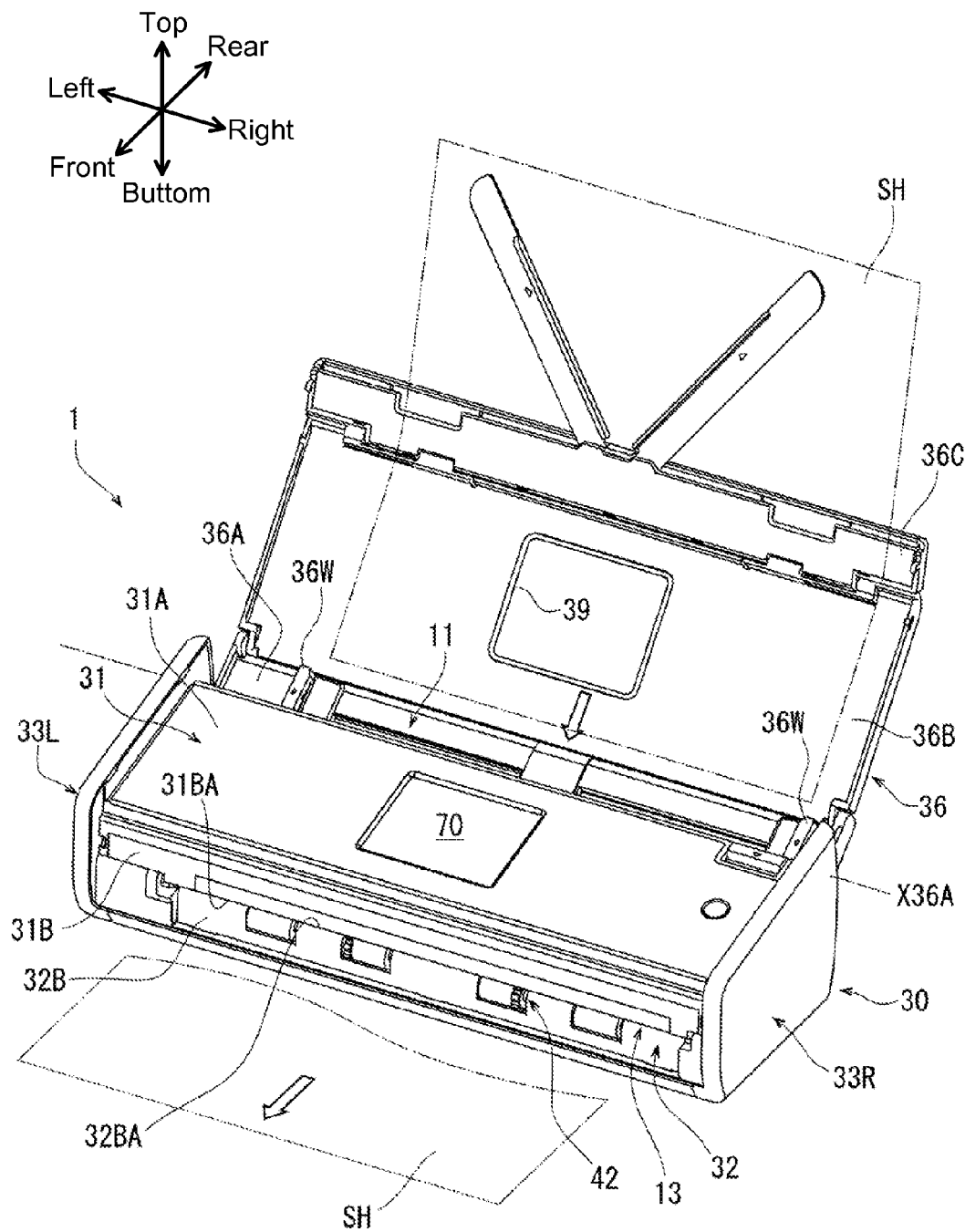
FIG. 1 is a front perspective view of an image reading apparatus, in an example embodiment according to one or more aspects of the disclosure, in which a sheet tray is open.

An example embodiment is described in detail herein with reference to the accompanying drawings, like reference numerals being used for like corresponding parts in the various drawings.

An image reading apparatus 1, as depicted in FIG. 1, may be an example of an image reading apparatus and a medium conveyance apparatus. In FIG. 1, a side of the image reading apparatus 1 on which a discharge opening 13 is disposed may be defined as the front side of the image reading apparatus 1. A side of the image reading apparatus 1 that is placed on the left when viewed from the side facing the discharge opening 13 may be defined as the left side of the image reading apparatus 1. To facilitate understanding of the orientation and relationship of the various elements disclosed herein, the front, rear, left, right, top, and bottom of the image reading apparatus 1 may be determined with reference to axes of the three-dimensional Cartesian coordinate system included in each of the relevant drawings.

As depicted in FIGS. 1-8, the image reading apparatus 1 may comprise a housing 30 and a sheet tray 36. The housing 30 may comprise a first chute member 31, a second chute member 32, and a pair of left and right side frames 33L and 33R that may be combined. More specifically, the left and right side frames 33L and 33R may be disposed with a space therebetween in the left and right direction. The upper end of each of the left and right side frames 33L and 33R may be connected to each of the left and right ends of the first chute member 31, respectively. The lower end of each of the left and right side frames 33L and 33R may be connected to each of the left and right ends of the second chute member 32, respectively.

The first chute member 31 disposed on the upper side and the second chute member 32 disposed on the lower side may oppose in a vertical direction, e.g., a top-bottom direction, with a distance therebetween. The first chute member 31 and the second chute member 32 may be interposed between the left and right side frames 33L and 33R.

Figure 5:
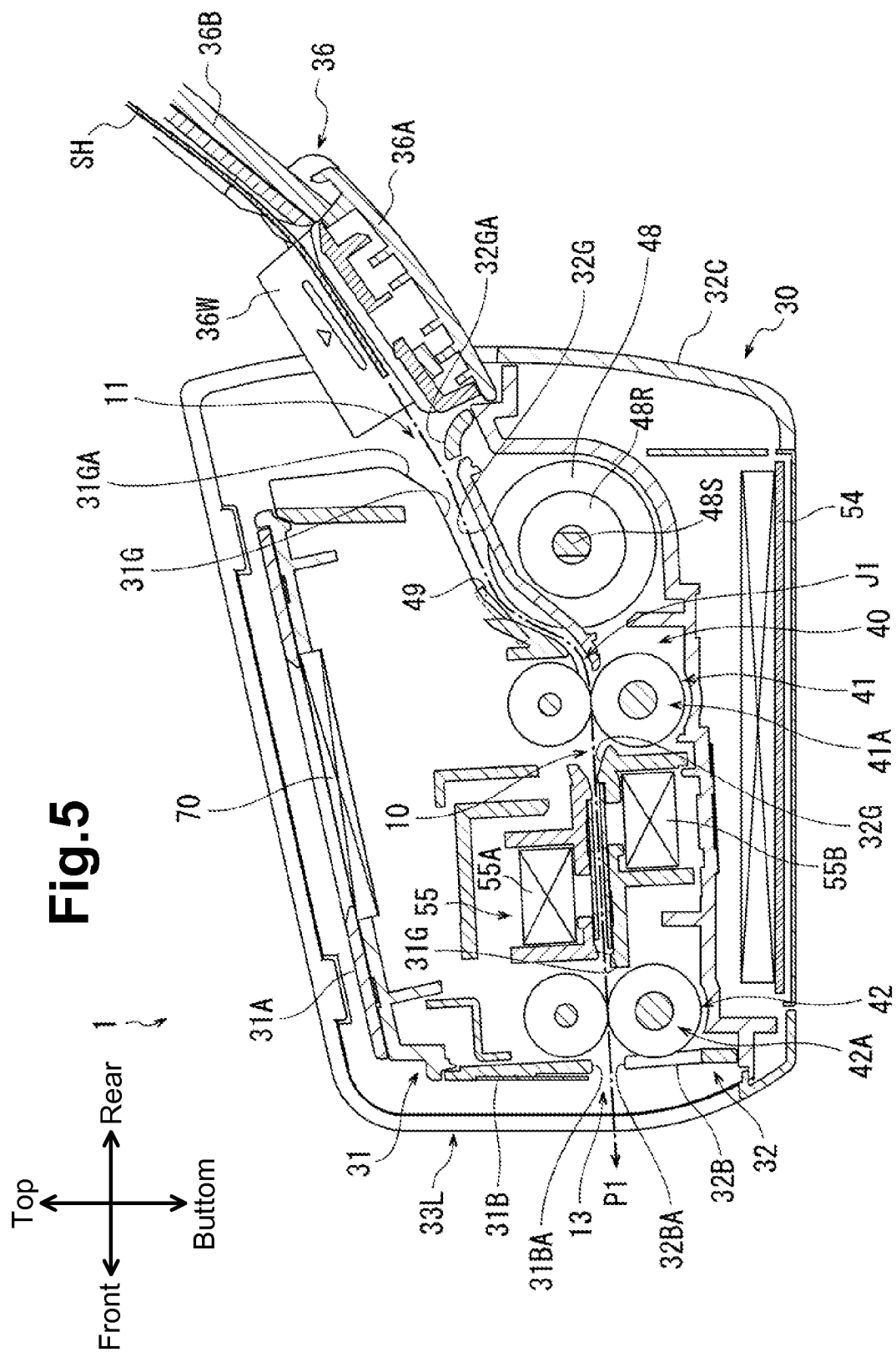
FIG. 5 is a sectional view of the image reading apparatus, taken along the line A-A in FIG. 4.
Figure 6:
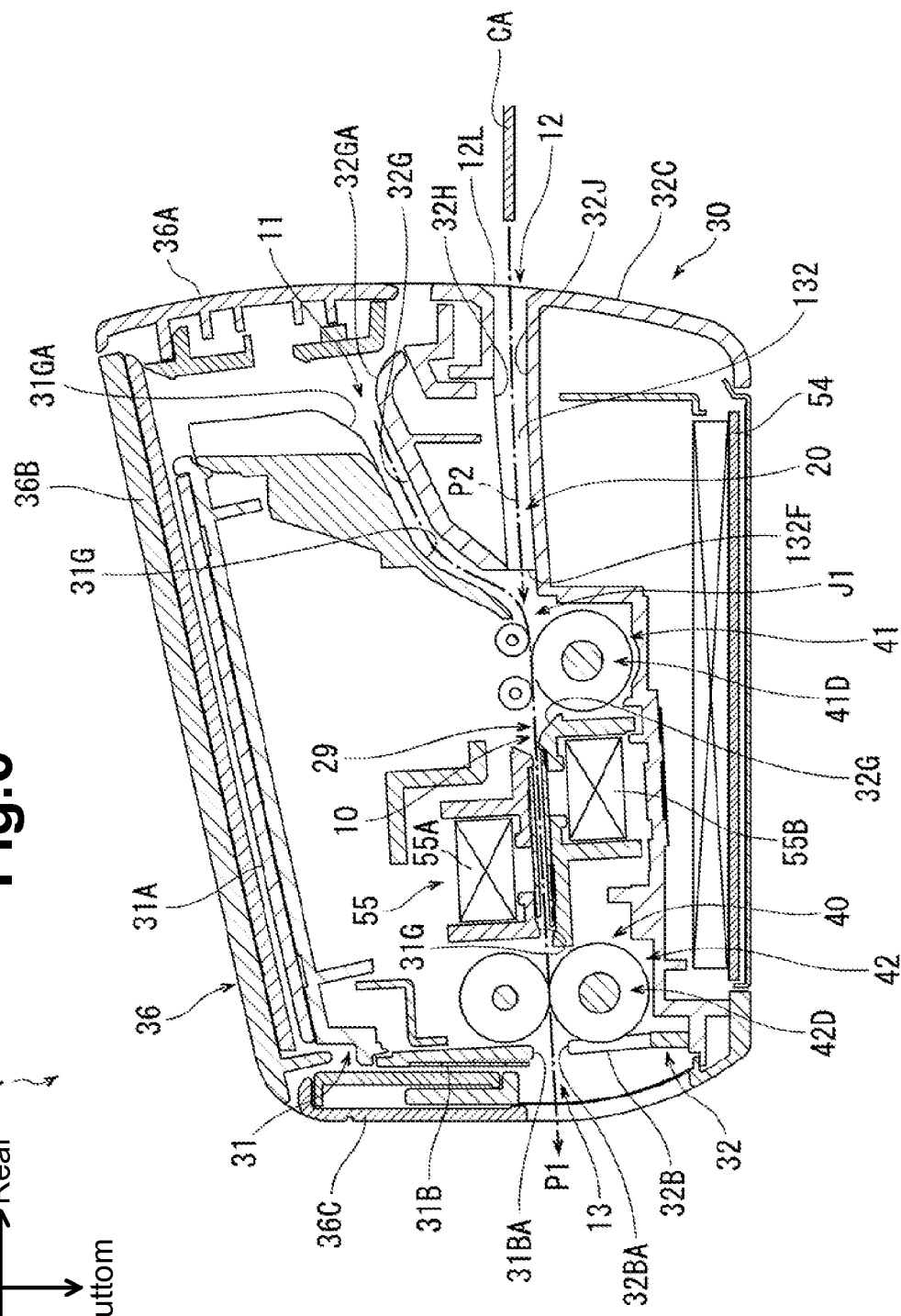
FIG. 6 is a sectional view of the image reading apparatus, taken along the line B-B in FIG. 4.
Figure 7:
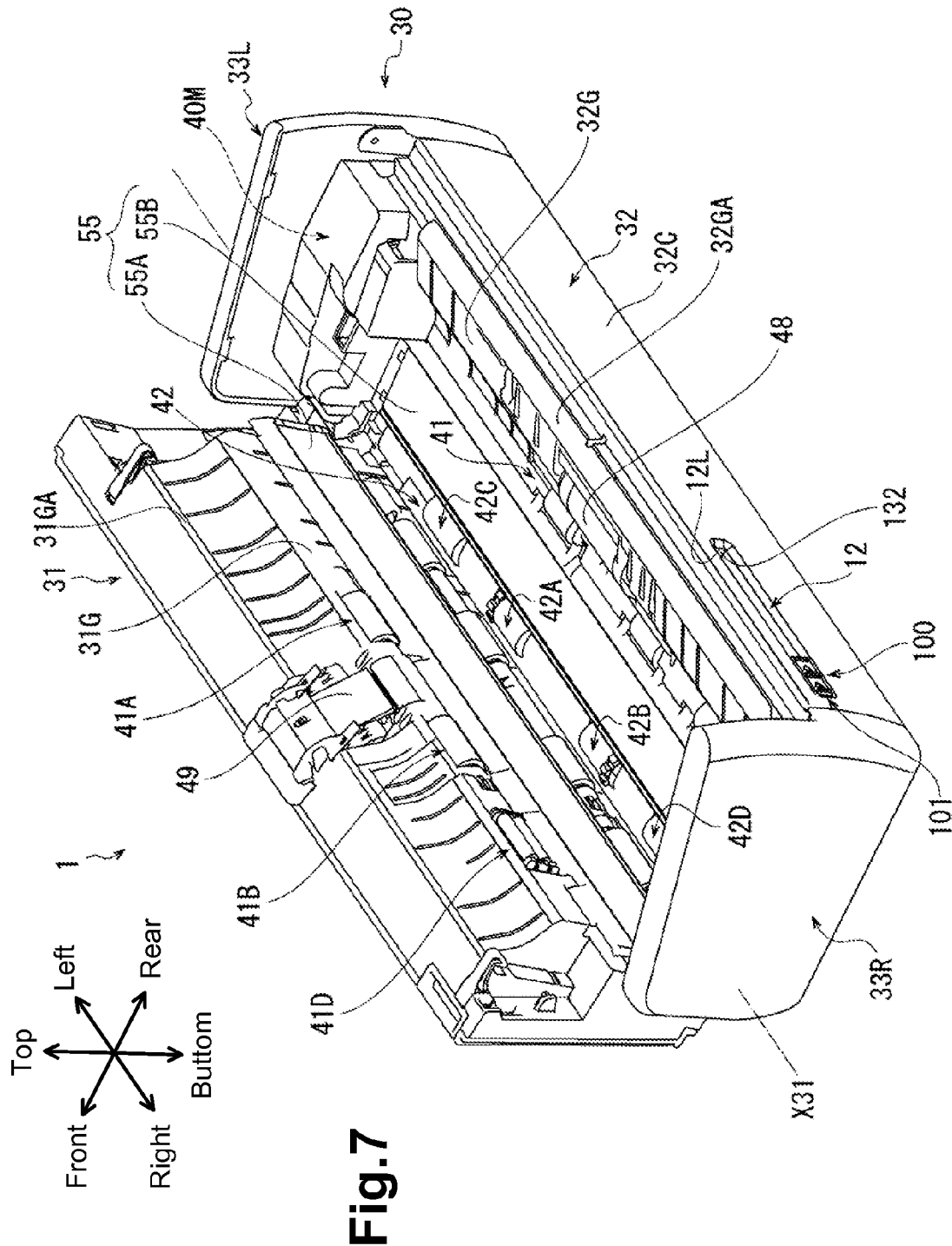
FIG. 7 is a perspective view of the image reading apparatus in which a first chute member is pivotally moved.

As depicted in FIGS. 1 and 5-7, the first chute member 31 may comprise an upper surface 31A, a front surface 31B, and an upper guide surface 31G. The upper surface 31A may comprise a flat surface facing upward. The upper surface 31A may slantingly extend forwardly and downwardly from its rear side. A touch panel 70 may be disposed at a central portion of the upper surface 31A. The front surface 31B may comprise a flat surface facing forward. The front surface 31B may extend vertically downward from the front end of the upper surface 31A to a lower end 31BA. As depicted in FIGS. 5-7, the upper guide surface 31G may comprise a curved surface that may be disposed on a rear portion thereof and a flat surface that may be disposed on a front portion thereof. The curved surface, e.g., an inclined portion, of the upper guide surface 31G may slantingly extend forwardly and downwardly from a rear end 31GA thereof, e.g., the rear end of the lower side of the upper surface 31A. The flat surface, e.g., a horizontal portion, of the upper guide surface 31G may extend forwardly from a central portion of the first chute member 31 in the front-rear direction to the lower end 31BA of the front surface 31B. In other words, the first chute member 31 may slantingly extend forwardly and downwardly from its rear side.

As depicted in FIGS. 1, 2 and FIGS. 5-7, the second chute member 32 may comprise a front surface 32B, a lower guide surface 32G and a rear surface 32C. The front surface 32B may comprise a flat surface facing forward. The front surface 32B may comprise an upper end 32BA. The upper end 32BA may be positioned below the lower end 31BA of the front surface 31B with a distance therebetween. The front surface 32B may extend vertically downward from the upper end 32BA. As depicted in FIGS. 5-7, the lower guide surface 32G may comprise a curved surface that may be disposed on a rear portion thereof and a flat surface that may be disposed on a front portion thereof. The curved surface, e.g., an inclined portion, of the lower guide surface 32G may slantingly extend forward and downward from a rear end 32GA thereof, e.g., the upper end of the rear surface 32C, along the inclined portion of the upper guide surface 31G. The flat surface, e.g., a horizontal portion, of the lower guide surface 32G may extend forward from a central portion of the second chute member 32 in the front-rear direction to the upper end 32BA of the front surface 32B. The rear surface 32C may comprise a flat surface facing rearward. The rear surface 32C may extend downward from its upper end in a generally vertical direction.

Figure 8:
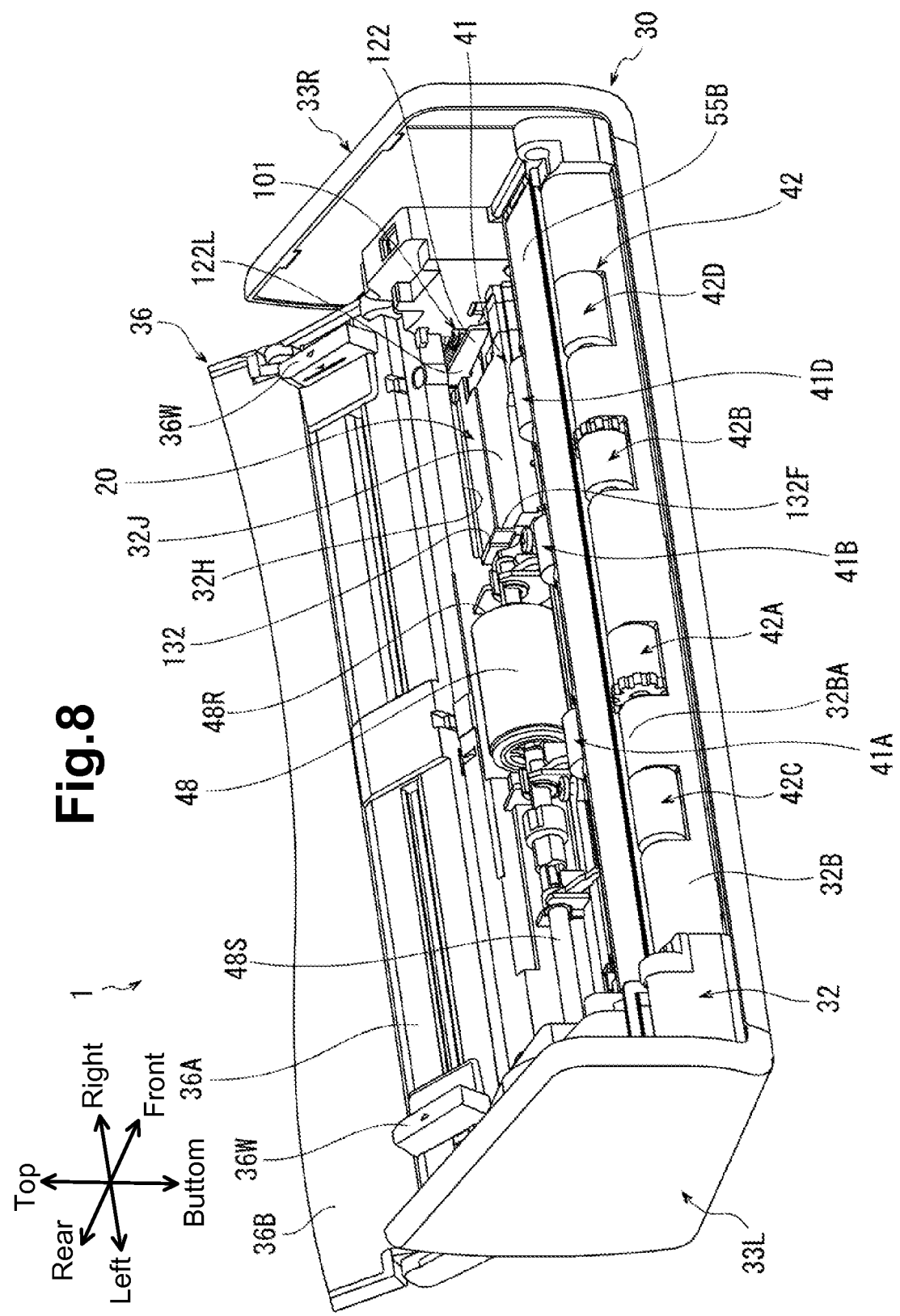
FIG. 8 is a perspective view of the image reading apparatus showing a separation roller and a drive shaft.

As depicted in FIGS. 6 and 8, the second chute member 32 may comprise a lower card guide surface 32J and an upper card guide surface 32H. The lower card guide surface 32J may extend horizontally rearward to the rear surface 32C from a right end in FIG. 6, i.e., the rear end, of the horizontal portion of the lower guide surface 32G. The upper card guide surface 32H may be positioned above the lower card guide surface 32J with a distance therebetween. The upper card guide surface 32H may extend horizontally rearward from the right end in FIG. 6, i.e., the rear end, of the horizontal portion of the upper guide surface 31G to the rear surface 32C in parallel with the lower card guide surface 32J. As depicted in FIG. 6, the height or level of the upper card guide surface 32H in the vertical direction may be almost the same as the height or level of the horizontal portion of the upper guide surface 31G in the vertical direction.

The upper guide surface 31G, the lower guide surface 32G, the upper card guide surface 32H, and the lower card guide surface 32J might not be limited to a smooth continuous surface, but may be constituted by, for example, tips of ribs or protrusions.

Figure 4:
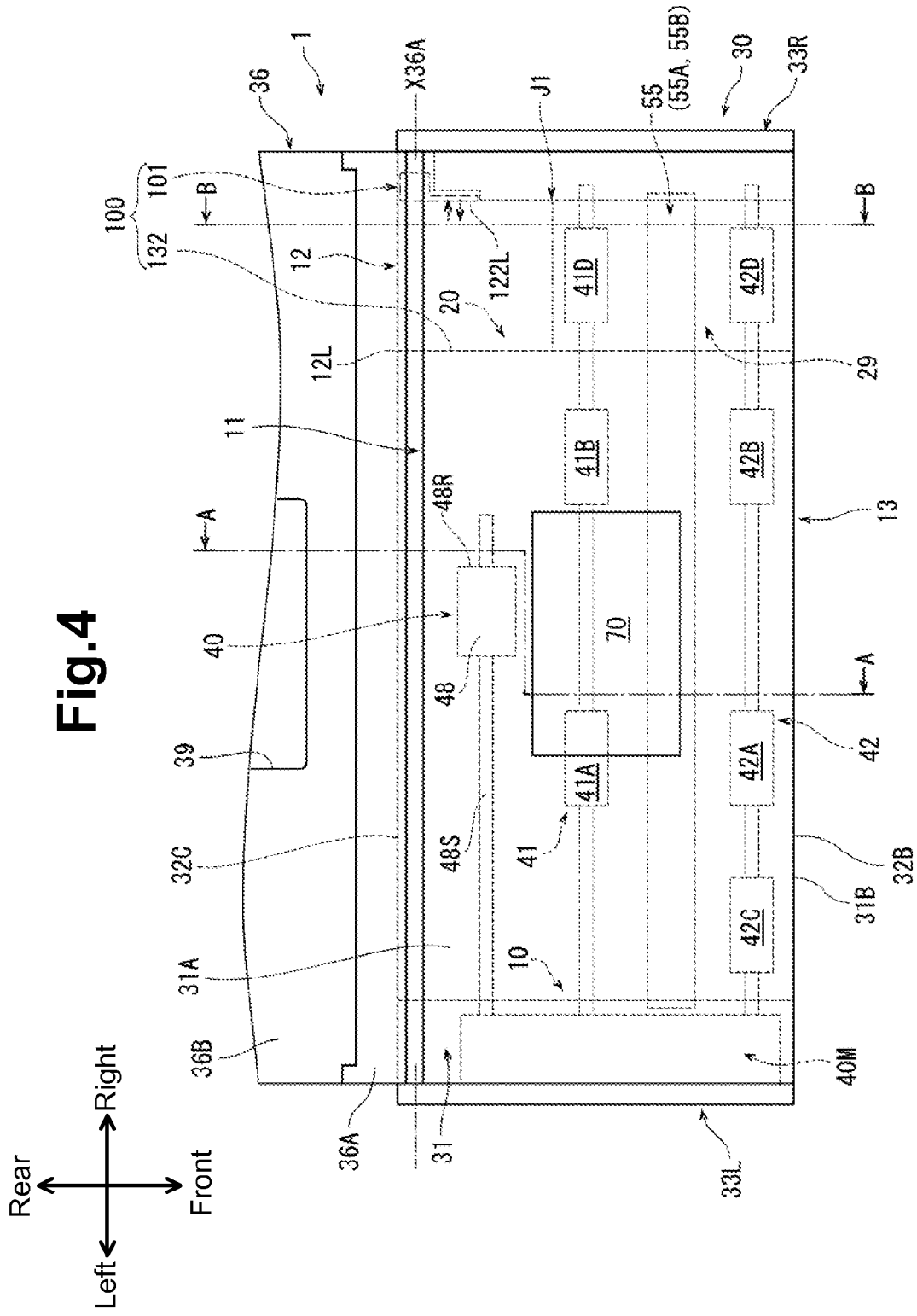
FIG. 4 is a diagrammatic top view of the image reading apparatus in which the sheet tray is open.

As depicted in FIGS. 4 and 6, a junction J1 may be disposed at a position where the lower card guide surface 32J may continue to the right end in FIG. 6, i.e., the rear end, of the horizontal portion of the lower guide surface 32G.

As depicted in FIGS. 1 and 5, the housing 30 may have a first introduction opening 11 and a discharge opening 13.

One or more sheets SH may be inserted into the first introduction opening 11. The sheet SH may comprise, for example, a sheet of paper or an overhead projector (OHP) sheet. The sheet SH may be an example of a medium.

More specifically, as depicted in FIG. 5, the first introduction opening 11 may be disposed between the first chute member 31 and the second chute member 32. The first introduction opening 11 may be provided at a space between the rear edge 31GA of the upper guide surface 31G and the rear edge 32GA of the lower guide surface 32G. As depicted in FIG. 1, the first introduction opening 11 may extend in the left-right direction from a portion near the left side frame 33L to a portion near the right side frame 33R. The length of the first introduction opening 11 in the left-right direction may be longer than the width of the sheet SH.

As depicted in FIGS. 1 and 5, the sheet SH may be discharged from the discharge opening 13. The discharge opening 13 may be disposed between the first chute member 31 and the second chute member 32. More specifically, the discharge opening 13 may be provided at a space between the lower end 31BA of the front surface 31B and the upper end 32BA of the front surface 32B. The discharge opening 13 may extend in the left-right direction from a portion near the left side frame 33L to a portion near the right side frame 33R. The length of the discharge opening 13 in the left-right direction may be longer than the width of the sheet SH, similar to the first introduction opening 11.

As depicted in FIGS. 4-6, the image reading apparatus 1 may comprise a first guide portion 10. The first guide portion 10 may comprise the first chute member 31 and the second chute member 32. The first guide portion 10 may comprise a first conveyance path P1 that may be defined between the upper guide surface 31G of the first chute member 31 and the lower guide surface 32G of the second chute member 32 in the vertical direction. The first guide portion 10 may be configured to guide the sheet SH from the first introduction opening 11 to the discharge opening 13 along the first conveyance path P1.

A portion of the first guide portion 10 may slantingly extend frontward and downward from the first introduction opening 11. Another portion of the first guide portion 10 may extend horizontally forward from a central portion of the housing 30 in the front-rear direction, e.g., the junction J1, to the discharge opening 13.

As depicted in FIG. 7, the first chute member 31 may be pivotally attached to the housing 30 about a rotation axis X31. The rotation axis X31 may extend in the left-right direction at the lower end 31BA of the front surface 31B of the first chute member 31. As the first chute member 31 pivotally moves to separate from the second chute member 32 in an upward direction, the first guide portion 10 may open.

As depicted in FIG. 4, a portion of the first guide portion 10 on the right side and on the side of the discharge opening 13 with respect to the junction J1 may be herein defined as a card conveyance area 29.

Figure 2:
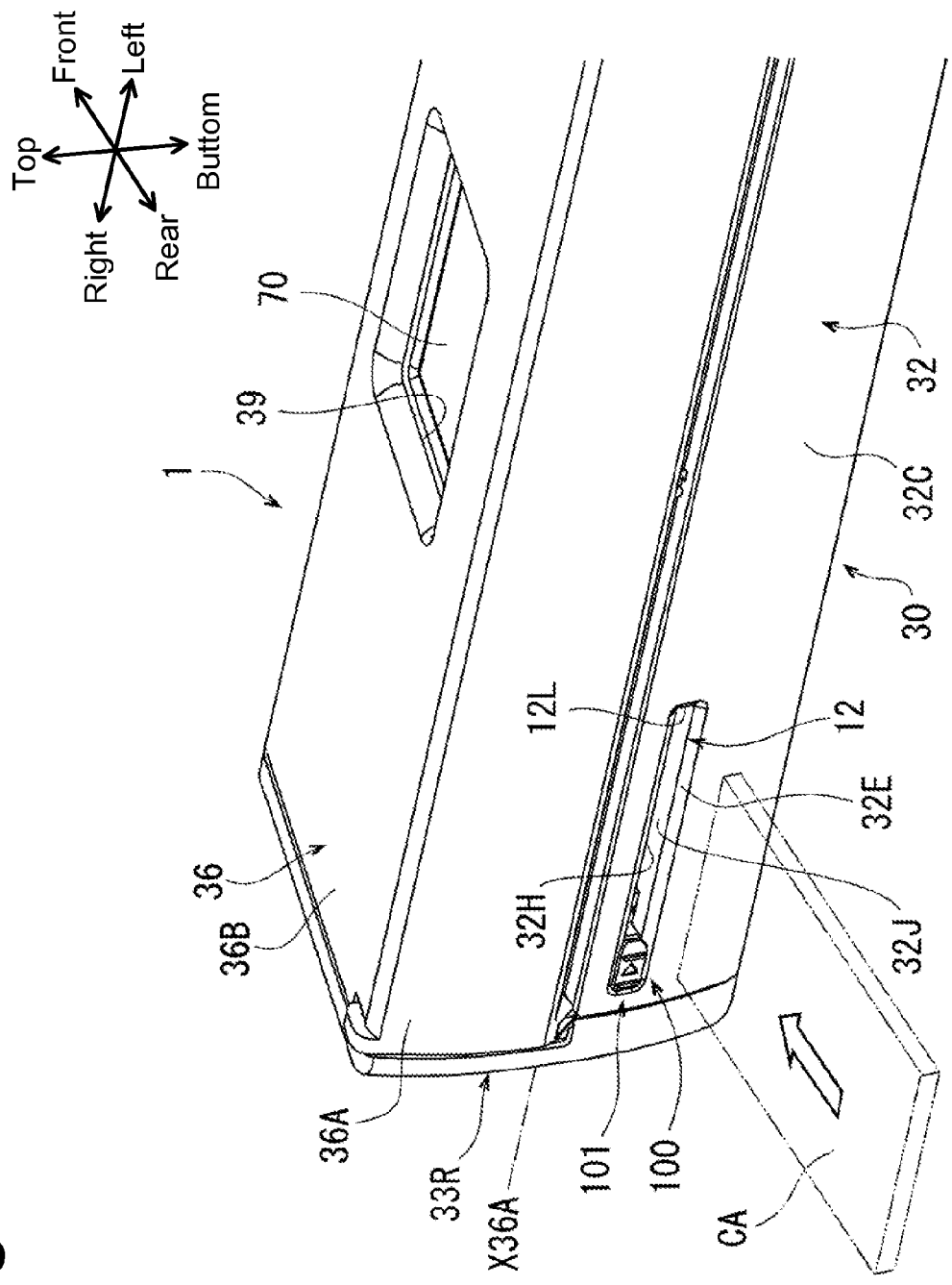
FIG. 2 is a rear perspective view of the image reading apparatus in which the sheet tray is closed.

As depicted in FIGS. 2 and 6, the housing 30 may have a second introduction opening 12. A card CA having a width smaller than that of the sheet SH may be inserted into the second introduction opening 12. The card CA may be a sheet having an area smaller than that of the sheet SH. The card CA may be, for example, a business card, an ATM card, a membership card, a license card. The card CA may be, for example, a business card, an ATM card, a membership card, and a license card. The length of the shorter side, e.g., width, and length of the longer side of the card CA may be, for example, 53.98 mm and 85.60 mm, respectively, of an ID-1 format card whose size is specified by the International Organization for Standardization (ISO)/International Electrotechnical Commission (IEC). The card CA may be thicker and more rigid than the sheet SH. The card CA may be an example of a medium.

More specifically, the second introduction opening 12 may be provided in the second chute member 32, as depicted in FIG. 6. The second introduction opening 12 may be disposed at a portion of the rear surface 32C on the side of the right side frame 33R. The second introduction opening 12 may extend in the left-right direction. The length of the second introduction opening 12 in the left-right direction may be shorter than the length of the first introduction opening 11 in the left-right direction. The width of the second introduction opening 12 in the left-right direction may be longer than the width of the card CA, e.g., 85.60 mm. The height of the second introduction opening 12 in the vertical direction may be almost the same as the height of the horizontal portion of the first guide portion 10 and the discharge opening 13 in the vertical direction. The second introduction opening 12 may be disposed below a right end portion of the first introduction opening 11 in the vertical direction.

The left-right direction of the image reading apparatus 1 may be an example of a width direction. In the example embodiment, one end and an opposite end in the width direction may be examples of a right end and a left end, respectively.

As depicted in FIG. 2, a movable guide 100 may define a width of the second introduction opening 12. The movable guide 100 may be configured to position the card CA inserted from the second introduction opening 12 in the left-right direction.

Figure 3:
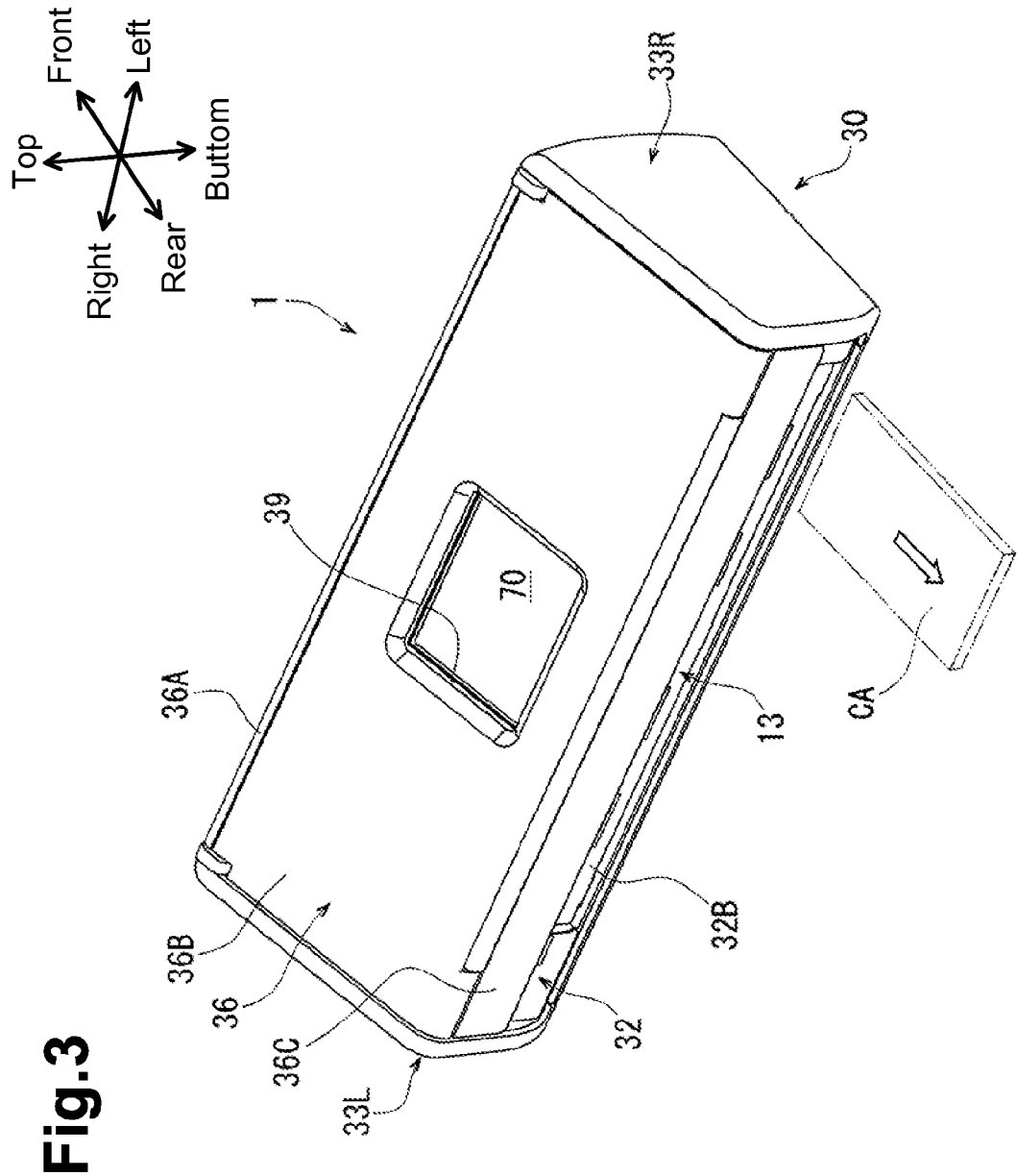
FIG. 3 is a front perspective view of the image reading apparatus in which the sheet tray is closed.

As depicted in FIGS. 3 and 6, the card CA may be discharged from a right end portion of the discharge opening 13. In other words, the discharge opening 13 may be shared to discharge the sheet SH inserted from the first introduction opening 11 and the card CA inserted from the second introduction opening 12.

As depicted in FIGS. 4, 6 and 8, the image reading apparatus 1 may comprise a second guide portion 20. The second guide portion 20 may comprise a second conveyance path P2 that may be defined between the upper card guide surface 32H of the second chute member 32 and the lower card guide surface 32J in vertical direction, as depicted in FIG. 6. The second guide portion 20 may join the first guide portion 10 at the junction J1. The second guide portion 20 may be configured to guide the card CA inserted from the second introduction opening 12 along the second conveyance path P2, to the first guide portion 10.

The junction J1 may be disposed between the inclined portion and the horizontal portion of the upper guide surface 31G. The second guide portion 20 may join the first guide portion 10 at the junction J1. Thus, the second guide portion 20 and a right side portion of the first guide portion 10 where the card conveyance area 29 may be disposed, may define a path extending horizontally from the second introduction opening 12 disposed on the rear side of the image reading apparatus 1 to the right end portion of the discharge opening 13 disposed on the front side of the image reading apparatus 1. The card CA may be guided from the second introduction opening 12 to the right side portion of the discharge opening 13 along the path.

As depicted in FIG. 1, the sheet tray 36 may comprise a base portion 36A, a central portion 36B and a tip portion 36C. The base portion 36A may be pivotally supported by the side frames 33L and 33R about a rotation axis X36A extending along the left-right direction. The central portion 36B may be connected to an end of the base portion 36A further from the rotation axis X36A. The tip portion 36C may be connected to an end of the central portion 36B further from the base portion 36A. The central portion 36B may have an opening 39 of a rectangular shape at a central portion thereof.

When the sheet tray 36 is open as depicted in FIGS. 1 and 5, the base portion 36A, the central portion 36B and the tip portion 36C may extend upward and rearward so as to continue to the inclined portion of the lower guide surface 32G. When the sheet tray 36 is open, the first introduction opening 11 may open. One or more sheets SH may be placed on the sheet tray 36. The sheet tray 36 may comprise a pair of left and right width regulation guides 36W. The width regulation guides 36W may be configured to interpose one or more sheets SH placed on the sheet tray 36 therebetween in the left-right direction, to position the sheets SH on the sheet tray 36 with respect to the left-right direction. The sheets SH placed on the sheet tray 36 may be inserted into the first introduction opening 11 and be guided to the discharge opening 13 by the first guide portion 10.

When the sheet tray 36 is closed as depicted in FIGS. 2, 3 and 6, the base portion 36A may extend vertically and be flush with the rear surface 32C of the second chute member 32. The central portion 36B may cover the upper surface 31A of the first chute member 31 from above. The tip portion 36C may cover the front surface 31B of the first chute member 31 from the front side of the front surface 31B. As depicted in FIGS. 2 and 3, the opening 39 may allow the touch panel 70 to be exposed outside the image reading apparatus 1 when the sheet tray 36 is closed.

As depicted in FIGS. 4-6, the image reading apparatus 1 may comprise a control board 54, a drive source 40M, a conveyor 40 and a reader 55.

As depicted in FIGS. 5 and 6, the control board 54 may be disposed at a bottom portion of the second chute member 32. The control board 54 may be a flat-shaped electronic circuit board comprising a central processing unit (CPU), a read-only memory (ROM), and a random-access memory ("RAM"). Power may be supplied to the control board 54 from a home electric outlet, via an AC adapter and a power supply cord. The control board 54 may be electrically connected to, for example, the drive source 40M, the reader 55, and the touch panel 70. The control board 54 may be configured to control the drive source 40M, the reader 55, and the touch panel 70 by supplying power to the drive source 40M, the reader 55, and the touch panel 70 when necessary.

As depicted in FIG. 4, the drive source 40M may be disposed in the housing 30 at the left side frame 33L. The drive source 40M may comprise a motor and transmission gears. The drive source 40M may be configured to generate the drive force while the motor is controlled by the control board 54.

As depicted in FIGS. 4-8, the conveyor 40 may comprise a separation roller 48, a drive shaft 48S, a separation pad 49, an upstream-side conveyor portion 41, and a downstream-side conveyor portion 42. The reader 55 may comprise a first reader 55A and a second reader 55B. In the first guide portion 10, the separation roller 48 and the separation pad 49 may be followed by the upstream-side conveyor portion 41, the second reader 55B, the first reader 55A, and the downstream-side conveyor portion 42 that may be arranged in this order from the upstream side to the downstream side in a conveyance direction. The sheet SH and the card CA may be conveyed in the conveyance direction from the first introduction opening 11 and the second introduction opening 12, respectively, toward the discharge opening 13. The separation roller 48 and the separation pad 49 may be disposed on the side of the first introduction opening 11 with respect to the junction J1. The upstream-side conveyor portion 41, the second reader 55B, the first reader 55A and the downstream-side conveyor portion 42 may be disposed on the side of the discharge opening 13 with respect to the junction J1.

As depicted in FIGS. 5 and 8, the separation roller 48 may be rotatably supported in the second chute member 32. An upper portion of the separation roller 48 may be exposed from the inclined portion of the lower guide surface 32G toward the first guide portion 10.

As depicted in FIGS. 4 and 8, the separation roller 48 may be disposed at a central portion of the first guide portion 10 in the left-right direction. The central portion of the first guide portion 10 in the left-right direction may comprise at least an area of the first guide portion 10 on a left side of the card conveyance area 29. The separation roller 48 may be connected to the drive source 40M by the drive shaft 48S. The drive shaft 48S may be coaxial with the separation roller 48 and extend in the left-right direction. The right end of the drive shaft 48S may slightly protrude rightward from a right end surface 48R of the separation roller 48. The drive shaft 48S may be rotatably supported by the second chute member 32. The right end of the drive shaft 48S may stop or be positioned at the left of the card conveyance area 29, e.g., on the left side with respect to the card conveyance area 29. The drive shaft 48S may be configured to transmit the drive force from the drive source 40M to the separation roller 48.

The separation roller 48 may be configured to be driven by the drive source 40M, via the drive shaft 48S. The control board 54 may be configured to control the drive source 40M. As depicted in FIG. 5, the separation roller 48 may be configured to rotate while making contact with the sheets SH placed on the sheet tray 36 to feed the sheets SH to the first guide portion 10.

As depicted in FIG. 7, the separation pad 49 may be disposed at the first chute member 31. As depicted in FIG. 5, the separation pad 49 may be exposed to the first guide portion 10 in the upper guide surface 31G. The separation pad 49 may comprise a friction member, e.g., rubber and elastomer, having a plate shape. The separation pad 49 may be biased by a biasing member (not depicted) so that the separation pad 49 may be pressed against the separation roller 48 when the first chute member 31 is closed. The separation roller 48 and the separation pad 49 may be configured to separate the sheets SH to be conveyed in the first guide portion 10 one by one while holding the sheets SH therebetween.

As depicted in FIGS. 4-8, the upstream-side conveyor portion 41 may comprise first conveyance roller pairs 42A and 42B and a second conveyance roller pair 41D. The first conveyance roller pairs 42A and 42B and the second conveyance roller pair 41D may be disposed in the horizontal portions of the upper guide surface 31G and the lower guide surface 32G at the same positions in the conveyance direction. Each of the first conveyance roller pairs 42A and 42B and the second conveyance roller pair 41D may comprise a drive roller configured to be rotated by the drive source 40M and a driven roller facing the drive roller in the vertical direction when the first chute member 31 is closed.

The first conveyance roller pairs 42A and 42B may be disposed outside the card conveyance area 29 in the left-right direction. The first conveyance roller pairs 42A and 42B may be configured to rotate while holding or nipping the sheet SH to convey the sheet SH in the first guide portion 10. The second conveyance roller pair 41D may be disposed at the card conveyance area 29. The second conveyance roller pair 41D may be configured to rotate while holding or nipping the card CA, to convey the card CA at the card conveyance area 29 in the first guide portion 10. As depicted in FIGS. 4 and 6, the second conveyance roller pair 41D may be disposed in front of the junction J1. In other words, the junction J1 may be disposed between the separation roller 48 and the second conveyance roller pair 41D in the front-rear direction.

The second reader 55B may be attached to the second chute member 32. More specifically, the second reader 55B may comprise a contact image sensor ("CIS"), a CIS holder and a contact glass. The upper surface of the second reader 55B may be exposed to the first guide portion 10 at the horizontal portion of the lower guide surface 32G.

The first reader 55A may be attached to the first chute member 31. More specifically, the first reader 55A may comprise a contact image sensor ("CIS"), a CIS holder and a contact glass. The lower surface of the first reader 55A may be exposed to the first guide portion 10 at the horizontal portion of the upper guide surface 31G.

The first reader 55A may be disposed closer to the discharge opening 13 than the second reader 55B. The first reader 55A and the second reader 55B may be disposed across the entire length of the first guide portion 10 comprising the card conveyance area 29 in the left-right direction. The first reader 55A and the second reader 55B may be disposed opposite to each other in the vertical direction to interpose the first guide portion 10.

With the above-described structure, the first reader 55A and the second reader 55B may be configured to read an image on each side of the sheet SH when the sheet SH is conveyed in the first guide portion 10. The first reader 55A and the second reader 55B may also be configured to read an image on each side of the card CA when the card CA guided by the second guide portion 20 is conveyed in the card conveyance area 29.

The downstream-side conveyor portion 42 may comprise first conveyance roller pairs 42A, 42B, and 42C and a second conveyance roller pair 42D. The first conveyance roller pairs 42A, 42B, and 42C and the second conveyance roller pair 42D may be disposed in the horizontal portions of the upper guide surface 31G and the lower guide surface 32G at the same position in the conveyance direction. Each of the first conveyance roller pairs 42A, 42B, and 42C and the second conveyance roller pair 42D may comprise a drive roller configured to be rotated by the drive source 40M and a driven roller facing the drive roller in the vertical direction when the first chute member 31 is closed.

The first conveyance roller pairs 42A, 42B, and 42C may be disposed outside the card conveyance area 29 in the left-right direction. The first conveyance roller pairs 42A, 42B, and 42C may be configured to rotate while holding or nipping the sheet SH being conveyed in the first guide portion 10, to discharge the sheet SH outside the housing 30 through the discharge opening 13. The second conveyance roller pair 42D may be disposed at the card conveyance area 29. The second conveyance roller pair 42D may be configured to rotate while holding or nipping the card CA whose image has been read in the card conveyance area 29, to discharge the card CA outside the housing 30 through the right portion of the discharge opening 13.

As depicted in FIGS. 1 and 5, the touch panel 70 may be attached to an interior of the first chute member 31 on the upper surface 31A side. The touch panel 70 may be exposed outside the first chute member 31 through a rectangular-shaped touch panel opening 31H that may be provided in the upper surface 31A. The touch panel 70 may comprise a liquid crystal display panel, a light source, e.g., fluorescent lamp or a light-emitting diode (LED), configured to irradiate the liquid crystal display panel with light from the back side of the liquid crystal display panel, and a contact sensing film attached to a surface of the liquid crystal display panel.

The touch panel 70 may be configured to display an operational status of the image reading apparatus 1, e.g., a processing status of an image reading operation and errors, and various buttons, e.g., buttons to start an image reading operation and to make settings, under the control of the control board 54. The touch panel 70 may be configured to permit an external input. When a button displayed in the touch panel 70 is touched to perform an operation or setting corresponding to the button, the touch panel 70 may transmit a signal in response to the touch operation, to the control board 54.

The image reading apparatus 1 may be configured to read an image on the sheet SH and the card CA.

When an image on the sheet SH is read, the sheet tray 36 may be open, as depicted in FIGS. 1 and 5. One or more sheets SH may be placed on the sheet tray 36. When the control board 54 receives an instruction to read an image on the sheet SH from the touch panel 70, the control board 54 may start the operation of reading an image on the sheet SH after a sheet detection sensor (not depicted) detects that one or more sheets SH are placed on the sheet tray 36.

The control board 54 may send an instruction to generate the drive force to the drive source 40M. In response to the instruction, the separation roller 48 may be first rotated while holding the sheet SH together with the separation pad 49. The separation roller 48 may introduce the sheet SH placed on the sheet tray 36 through the first introduction opening 11 and fed the sheet SH to the first guide portion 10. At this time, the sheets SH may be separated one by one due to frictional force between the separation pad 49 and the sheet SH if the sheets SH are conveyed at one time.

Thereafter, the first conveyance roller pairs 41A and 41B of the upstream-side conveyor portion 41 may convey the sheet SH fed by the separation roller 48 in the first guide portion 10. The first reader 55A and the second reader 55B may read an image on each side of the sheet SH being conveyed in the first guide portion 10. The first conveyance roller pairs 42A, 42B, and 42C of the downstream-side conveyor portion 42 may discharge the sheet SH whose image has been read, outside the housing 30 through the discharge opening 13.

When an image on the card CA is read, the sheet tray 36 may be closed, as depicted in FIGS. 2, 3 and 6. When the sheet tray 36 is closed, the card CA may be inserted into the second introduction opening 12 from the rear side of the housing 30, as depicted in FIG. 2. Thereafter, the card CA may pass through the second guide portion 20. The leading end of the card CA may reach the card conveyance area 29. When the control board 54 receives an instruction to read an image on the card CA from the touch panel 70, the control board 54 may start the operation of reading an image on the card CA after a card detection sensor (not depicted) detects that the card CA is inserted from the second introduction opening 12.

The control board 54 may send an instruction to generate the drive force to the drive source 40M. The second conveyance roller pair 41D of the upstream-side conveyor portion 41 may convey the card CA in the card conveyance area 29. The first reader 55A and the second reader 55B may read an image on each side of the card CA being conveyed in the card conveyance area 29. As depicted in FIG. 3, the second conveyance roller pair 42D of the downstream-side conveyor portion 42 may discharge the card CA whose image has been read, outside the housing 30 through the discharge opening 13.

As depicted in FIGS. 2 and 4, the movable guide 100 may comprise a guide member 101.

As depicted in FIG. 4 and FIGS. 6-8, the inner wall surface 132 may be part of the second chute member 32. The inner wall surface 132 may extend into the housing 30, e.g., toward the front side, from a left end 12L of the second introduction opening 12 disposed at a left side thereof. The inner wall surface 132 may comprise a flat surface extending in the front-rear direction and vertical direction. The inner wall surface 132 may comprise a lower end, an upper end and a front end 132F. The lower end of the inner wall surface 132 may be connected to the left end of the lower card guide surface 32J. The upper end of the inner wall surface 132 may be connected to the left end of the upper card guide surface 32H. The front end 132F of the inner wall surface 132 may be positioned near the junction J1, as depicted in FIGS. 6 and 8.

Figure 9:
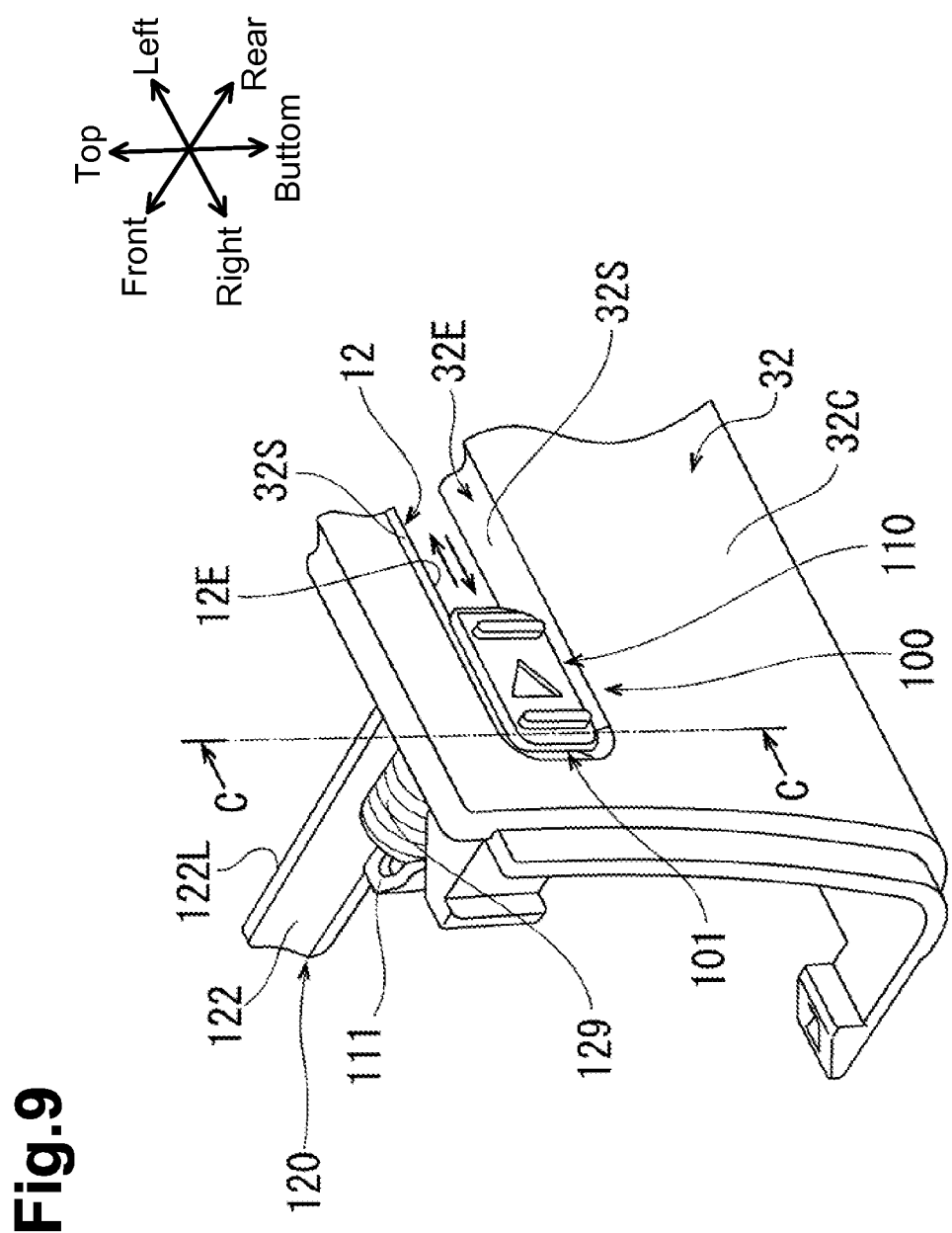
FIG. 9 is a partially perspective view of the image reading apparatus showing a second introduction opening and a movable guide thereof.
Figure 10:
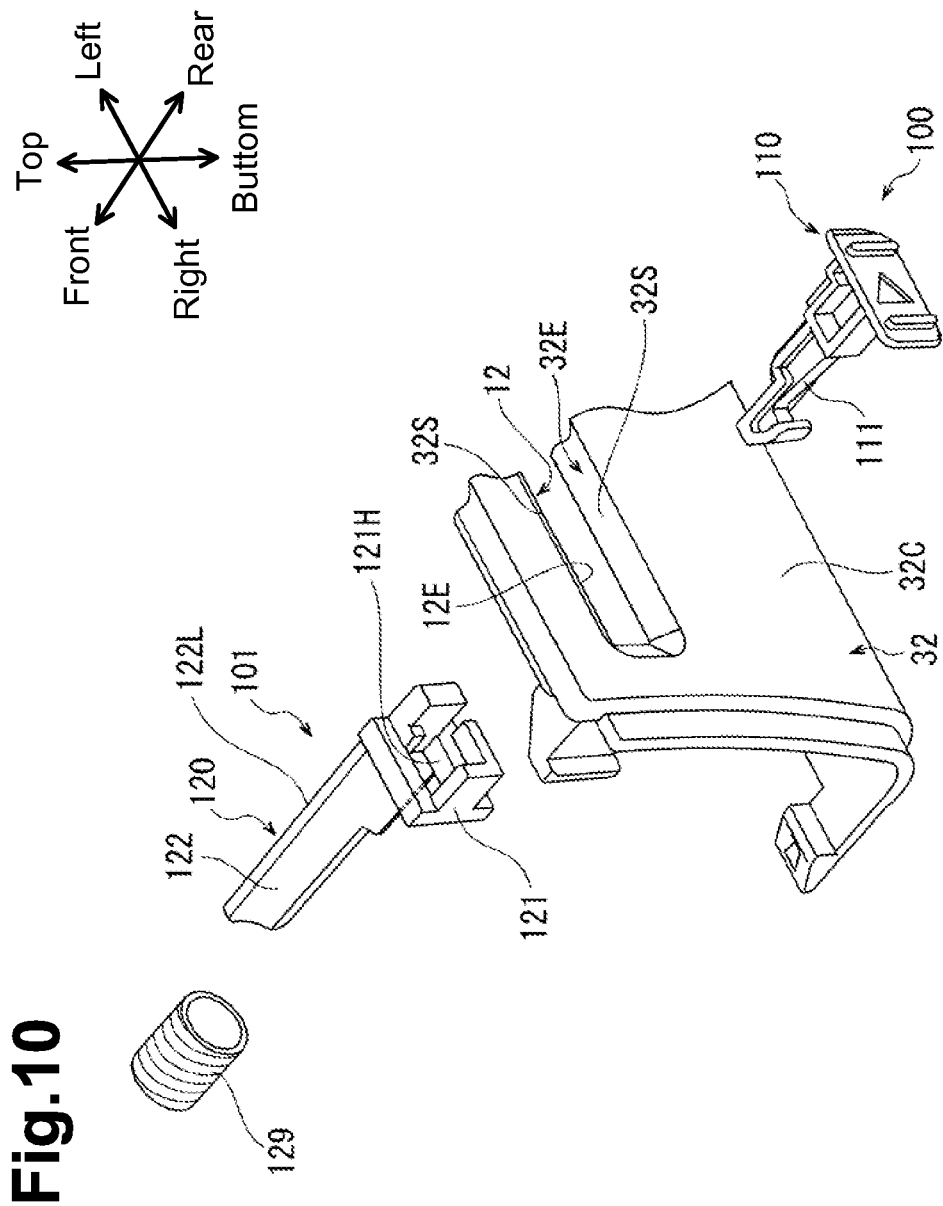
FIG. 10 is a partially exploded view of the image reading apparatus showing the second introduction opening and the movable guide.
Figure 11:
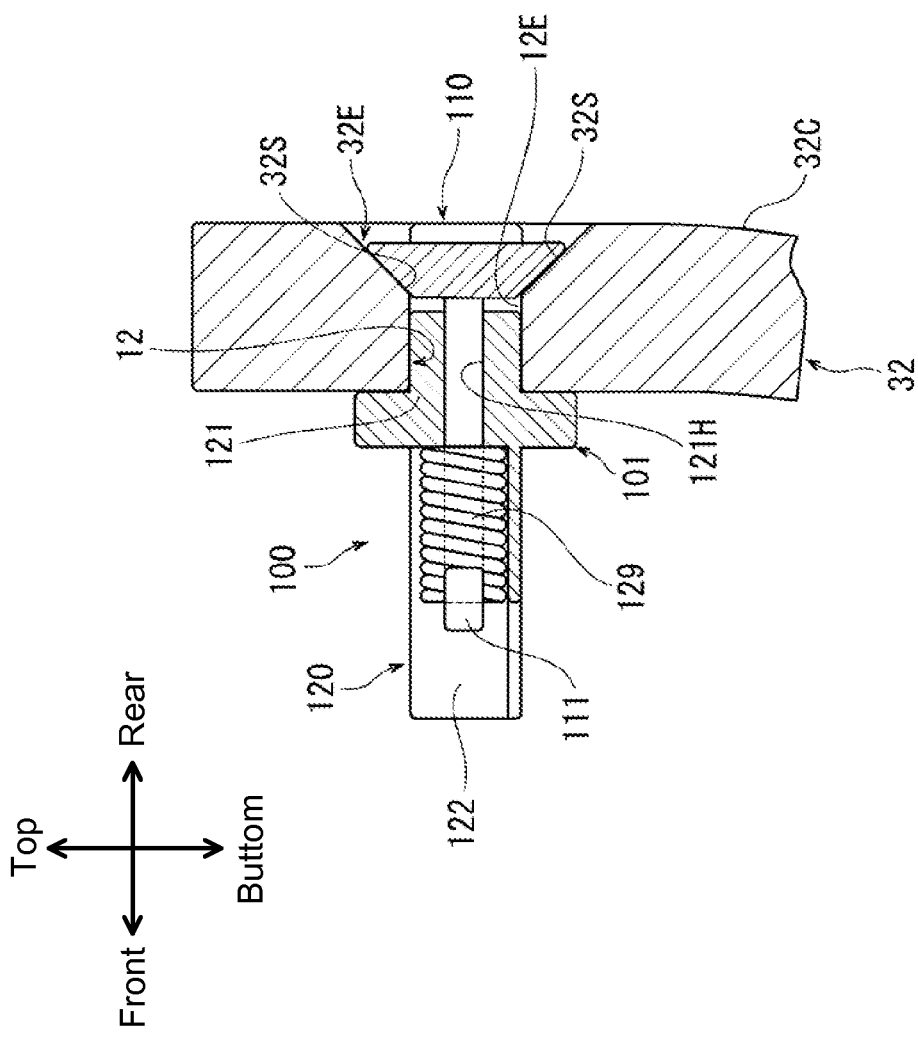
FIG. 11 is a sectional view of the image reading apparatus, taken along the line C-C in FIG. 9.

As depicted in FIGS. 2 and 4, the guide member 101 may be positioned on a side opposite to the left end 12L in the second introduction opening 12, e.g., at a right end portion of the second introduction opening 12. As depicted in FIGS. 9-11, the guide member 101 may comprise an operation portion 110 and a guide body 120. The guide member 101 may be supported by the second chute member 32 so as to move in the left-right direction approximately by a few to dozen or so millimeters.

The flat rear surface 32C may have a recess 32E that may be recessed toward the interior of the housing 30. The second introduction opening 12 may be provided in the recess 32E. The recess 32E may comprise a pair of inclined surfaces 32S. The inclined surfaces 32S may oppose in the vertical direction, e.g., a thickness direction of the card CA to be inserted into the second introduction opening 12. The inclined surfaces 32S may slantingly extend toward the interior of the housing 30 so as to come closer to each other. One of the inclined surfaces 32S may connect to an upper side of an opening end 12E of the second introduction opening 12. The other one of the inclined surfaces 32S may connect to a lower side of the opening end 12E.

The operation portion 110 may be positioned in the recess 32E. The operation portion 110 may comprise an exposure portion that may be exposed toward the rear surface 32C of the second chute member 32. The operation portion 110 may comprise protrusions at a rear surface thereof for easy operation by a user. As depicted in FIG. 11, the rear surface of the operation portion 110 may be flush with the rear surface 32C.

As depicted in FIGS. 9-11, the operation portion 110 may further comprise a projection 111. The projection 111 may extend forward from the exposure portion into the housing 30, e.g., in a direction perpendicular to the exposure portion. A front end portion of the projection 111 may bend like a hook.

The guide body 120 may be connected to the projection 111 of the operation portion 110 inside the housing 30. The guide body 120 may comprise a slide portion 121 and a regulation portion 122. The slide portion 121 may be configured to slidably contact the upper and lower sides of the opening end 12E of the second introduction opening 12 from the interior of the housing 30.

The slide portion 121 may have an insertion opening 121H configured to receive the projection 111. A compression coil spring 129 may be disposed between the front end, e.g., the hook portion, of the projection 111 inserted into the insertion opening 121H and the slide portion 121. The compression coil spring 129 may be configured to bias the slide portion 121 of the guide body 120 to bring the slide portion 121 closer to the operation portion 110 in the front-rear direction. The exposure portion of the operation portion 110 and the slide portion 121 may interpose a portion of the opening end 12E of the second introduction opening 12 therebetween in the front-rear direction. The compression coil spring 129 may be an example of a biasing portion. Appropriate frictional resistance may occur when the operation portion 110 and the slide portion 121 slide relative to the opening end 12E of the second introduction opening 12, due to a biasing force of the compression coil spring 129.

The regulation portion 122 may extend forward from the slide portion 121 into the housing 30, e.g., in a direction perpendicular to the slide portion 121. The regulation portion 122 may comprise a left surface 122L. As depicted in FIGS. 4 and 8, the left surface 122L may oppose the inner wall surface 132 in the left-right direction and extend parallel to the inner wall surface 132.

When the cards CA having different widths are inserted from the second introduction opening 12, the operation portion 110 may be operated or moved by a user in correspondence with the widths of the inserted cards CA. Accordingly, the guide member 101 may move in the left-right direction, so that the distance between the inner wall surface 132 and the left surface 122L of the regulation portion 122 of the guide member 101 may be adjusted in accordance with the widths of the inserted cards CA. Thus, the movable guide 100 may favorably position the cards CA with respect to the left-right direction.

In the image reading apparatus 1, the movable guide 100 may be configured to position the card CA inserted from the second introduction opening 12 in the left-right direction. Thus, in the image reading apparatus 1, such a situation may be prevented or reduced that the card CA may be slantingly inserted into the second introduction opening 12. Consequently, such a situation may be prevented or reduced that the reader 55 may read an image on the card CA being conveyed slantingly.

Accordingly, the reduction in the reading quality of an image on the card CA inserted from the second introduction opening 12 may be prevented or reduced in the image reading apparatus 1.

In the image reading apparatus 1, the sheet SH inserted from the first introduction opening 11 may be guided by the first guide portion 10 and discharged from the discharge opening 13. The card CA inserted from the second introduction opening 12 may be guided by the second guide portion 20 and may be guided by the first guide portion 10 from the junction J1. The card CA may be discharged from the discharge opening 13 that may be used to discharge the sheet SH as well. In other words, the sheet SH inserted from the first introduction opening 11 might not pass through the second introduction opening 12, unlike the known image reading apparatus. Therefore, even when the movable guide 100 configured to position the card CA inserted from the second introduction opening 12 in the left-right direction is provided in the second introduction opening 12, the movable guide 100 might not interfere with the sheet SH inserted from the first introduction opening 11. Consequently, in the image reading apparatus 1, the movable guide 100 might not have to be retracted with respect to the sheet SH inserted from the first introduction opening 11. Accordingly, reduction in the size of the image reading apparatus 1 may be realized.

In the image reading apparatus 1, the movable guide 100 may comprise the inner wall surface 132 extending from the left end 12L of the second introduction opening 12 into the housing 30 and the guide member 101 positioned at the right end portion of the second introduction opening 12. As compared with a case in which a guide member is disposed at each end of the second introduction opening 12 in the left-right direction, the movable guide 100 may be simplified, and an area occupied by the movable guide 100 may be reduced in the image reading apparatus 1. Consequently, reduction in the size of the image reading apparatus 1 may be reliably realized.

Further, in the image reading apparatus 1, the separation roller 48 may be disposed at a central portion of the housing 30 in the left-right direction, as depicted in FIG. 4. The second introduction opening 12 may be positioned at a right end portion of the housing 30. The guide member 101 may be positioned at a right end portion of the second introduction opening 12.

In the image reading apparatus 1, the separation roller 48 may be disposed at a central portion of the housing 30 in the left-right direction. The drive shaft 48S that may be coaxially disposed with the separation roller 48 may be configured to transmit the drive force to the separation roller 48 from the drive source 40M that may be disposed on the left end portion of the housing 30. In the image reading apparatus 1, an available space may be provided in the right side of the housing 30 because the right end of the drive shaft 48S may stop or be positioned near the right end surface 48R of the separation roller 48.

Further, in the image reading apparatus 1, the operation portion 110 and the slide portion 121 of the guide body 120 may interpose a portion of the opening end 12E of the second introduction opening 12 therebetween. The compression coil spring 129 may bias the slide portion 121 to bring the slide portion 121 closer to the operation portion 110. With the guide member 101 that may be simply structured, manufacturing costs of the image reading apparatus 1 may be reduced. With the compression coil spring 129, appropriate frictional resistance may occur when the guide member 101 slides, and the rattle of the regulation portion 122 extending into the housing 30 may be reduced or prevented. Therefore, the ease of operating and positioning the movable guide 100 may increase.

In the image reading apparatus 1, the operation portion 110 may be flush with the rear surface 32C having the second introduction opening 12 as depicted in FIG. 11. The guide member 101 might not protrude from the rear surface 32C in the image reading apparatus 1. Therefore, reduction in the size of the image reading apparatus 1 may be reliably realized.

Further, in the image reading apparatus 1, the operation portion 110 may be positioned in the recess 32E that may be recessed from the rear surface 32C into the housing 30. Thus, in the image reading apparatus 1, such a structure may be readily realized that the guide member 101 might not protrude from the rear surface 32C.

In the image reading apparatus 1, the card CA that is approaching the second introduction opening 12 may be guided by a pair of the inclined surfaces 32S into the housing 30 along the second introduction opening 12. Therefore, the card CA may be readily introduced into the second introduction opening 12.

While the disclosure has been described in detail with reference to the specific embodiment thereof, this is merely an example, and various changes, arrangements and modifications may be applied therein without departing from the spirit and scope of the disclosure.

For example, the disclosure may be applied to other apparatuses than the image reading apparatus, e.g., image forming apparatuses and multi-function apparatuses.

What is claimed is:

1. An image reading apparatus comprising:
a housing configured to have an opened state and a closed state, the housing including:
a first opening defined in a condition that the housing is in the opened state, the first opening configured to allow a first medium to be received,
a second opening configured to allow a second medium to be received, and
a discharge opening configured to allow the first medium and the second medium to be discharged therethrough;
a reader configured to read image data from the first medium and the second medium;
a conveyor configured to convey the first medium in a first conveyance direction from the first opening to the discharge opening via the reader, and the second medium in a second conveyance direction from the second opening to the discharge opening via the reader;
a movable guide disposed on the housing, and configured to be moved to regulate a width of the second opening defined in a direction perpendicular to the second conveyance direction, and including an operation portion that is exposed outside of the housing and configured to be moved by a user, and a guide body connected to the operation portion and extending from the second opening into the housing; and
a bias portion configured to press the guide body toward the operation portion.

2. The image reading apparatus according to claim 1,
wherein the housing further comprises an inner wall surface extending inside the housing from a first end of the second opening in the second conveyance direction,
wherein the movable guide defines a second end of the second opening in the direction perpendicular to the second conveyance direction, and
wherein the width of the second opening is defined by a distance from the first end of the second opening to the second end of the second opening.

3. The image reading apparatus according to claim 2,
wherein a conveyance path is defined on a first side of the housing between the inner wall surface and the movable guide, and
wherein the image reading apparatus further includes a drive source configured to generate drive force, and disposed on a second side of the housing opposite to the first side of the housing in the direction perpendicular to the second conveyance direction.

4. The image reading apparatus according to claim 1, wherein the movable guide includes a guide body extending inside the housing and configured to guide the second medium in the second conveyance direction.

5. The image reading apparatus according to claim 1, wherein the operation portion is exposed outside of the housing in both the opened state and the closed state.

6. The image reading apparatus according to claim 1, wherein a side surface comprising the second opening of the housing is a flat surface, the operation portion being flush with the side surface.

7. The image reading apparatus according to claim 1, wherein the second opening is defined between a pair of inclined surfaces extending toward an interior of the housing and each other, one of the inclined surfaces extending from an upper side of the housing and the other extending from a lower side of the housing.

8. The image reading apparatus according to claim 1, wherein the second opening is configured to allow the second medium to be received in the condition that the housing is in the closed state.

9. The image reading apparatus according to claim 8, wherein the second opening is configured to allow the second medium to be received in the condition that the housing is in the opened state.

10. The image reading apparatus according to claim 1,
wherein the width of the second opening is shorter than a width of the first opening defined in a direction perpendicular to the first conveyance direction, the width of the second opening being defined by the movable guide.

11. An image reading apparatus comprising:
a housing configured to have an opened state and a closed state, the housing including:
a first opening defined in a condition that the housing is in the opened state, the first opening configured to allow a first medium to be received;
a second opening configured to allow a second medium to be received; and
a discharge opening configured to allow the first medium and the second medium to be discharged therethrough;
a reader configured to read image data from the first medium and the second medium;
a conveyor configured to convey the first medium in a first conveyance direction from the first opening to the discharge opening via the reader, and the second medium in a second conveyance direction from the second opening to the discharge opening via the reader;
an inner wall surface extending inside the housing from a first end of the second opening in the second conveyance direction;
a movable guide disposed on the housing, defining a second end of the second opening, and configured to be moved to regulate a width of the second opening, the width of the second opening being defined by a distance from a first end of the second opening to a second end of the second opening in a direction perpendicular to the second conveyance direction;
a drive source configured to generate drive force, and disposed on a second side of the housing opposite to the first side of the housing in the direction perpendicular to the second conveyance direction; and
a sheet tray,
wherein a conveyance path is defined on a first side of the housing between the inner wall surface and the movable guide;
wherein the conveyor includes:
a separation roller disposed between the inner wall surface and the second side of the housing and configured to separate the first medium from the sheet tray; and
a drive shaft connected to the separation roller and the drive source, and configured to transmit the drive force from the drive source to the separation roller,
wherein the drive shaft extends in the direction perpendicular to the second conveyance direction from the driving source to a side of the inner wall surface which is opposite to the conveyance path.

12. The image reading apparatus according to claim 11,
wherein the width of the second opening is shorter than a width of the first opening defined in a direction perpendicular to the first conveyance direction, the width of the second opening being defined by the movable guide.

13. An image reading apparatus comprising:
a conveyor configured to convey a first medium in a first conveyance direction along a first conveyance path and a second medium in a second conveyance direction along a second conveyance path;
a housing including:
   a first chute member;
   a second chute member facing the first chute member, the second chute member including an opening configured to allow a second medium to be received, the first conveyance path being defined between the first chute member and the second chute member;
a reader configured to read image data from the first medium and the second medium;
a movable guide disposed on the housing and configured to be moved to regulate a width of the opening defined in a direction perpendicular to the second conveyance direction, and including an operation portion that is exposed outside of the housing and configured to be moved by a user, and a guide body connected to the operation portion in the housing and extending from the opening into the housing; and
a bias portion configured to press the guide body toward the operation portion.

14. The image reading apparatus according to claim 13,
wherein the housing further comprises an inner wall surface extending inside the housing from a first end of the opening in the second conveyance direction,
wherein the movable guide defines a second end of the opening in the direction perpendicular to the second conveyance direction, and
wherein the width of the opening is defined by a distance from the first end of the opening to the second end of the opening.

15. The image reading apparatus according to claim 14,
wherein the second conveyance path is defined on a first side of the housing between the inner wall surface and the movable guide, and
wherein the image reading apparatus further includes a drive source configured to generate drive force, and disposed on a second side of the housing opposite to the first side of the housing in the direction perpendicular to the second conveyance direction.

16. The image reading apparatus according to claim 13, wherein the movable guide includes a guide body extending inside the housing and configured to guide the second medium in the second conveyance direction.

17. The image reading apparatus according to claim 13, wherein the housing is configured to have an opening state and a closed state, the operation portion being exposed outside of the housing in both the opened state and the closed state.

18. The image reading apparatus according to claim 13, wherein a side surface comprising the opening of the housing is a flat surface, the operation portion being flush with the side surface.

19. The image reading apparatus according to claim 13,
wherein the width of the opening is shorter than a width of the first conveyance path defined in a direction perpendicular to the first conveyance direction, the width of the opening being defined the movable guide.

* * * * *